US012800110B2

(12) United States Patent
Wang

(10) Patent No.: US 12,800,110 B2
(45) Date of Patent: Nov. 17, 2026

(54) CARBON DIOXIDE ENERGY STORAGE SYSTEM AND GAS STORAGE SUBSYSTEM THEREOF

(71) Applicant: Exax Energy Technology (Shenzhen) Co., Ltd, Shenzhen (CN)

(72) Inventor: Qin Wang, Shenzhen (CN)

(73) Assignee: Exax Energy Technology (Shenzhen) Co., Ltd, Shenzhen (CN)

( * ) Notice: Subject to any disclaimer, the term of this patent is extended or adjusted under 35 U.S.C. 154(b) by 4 days.

(21) Appl. No.: 19/344,593

(22) Filed: Sep. 30, 2025

(65) Prior Publication Data

US 2026/0168623 A1 Jun. 18, 2026

(30) Foreign Application Priority Data

Dec. 13, 2024 (CN) ........................ 202411841851.9

(51) Int. Cl.
*F17C 7/02* (2006.01)

(52) U.S. Cl.
CPC ........ *F17C 7/02* (2013.01); *F17C 2205/0323* (2013.01); *F17C 2205/0352* (2013.01); *F17C 2221/013* (2013.01); *F17C 2227/0157* (2013.01)

(58) Field of Classification Search
CPC ............ F01K 25/103; F17C 2205/0323; F17C 2221/013; F17C 7/02
See application file for complete search history.

(56) References Cited

FOREIGN PATENT DOCUMENTS

| | | | | |
|---|---|---|---|---|
| CN | 111648833 A | * | 9/2020 | F28D 15/02 |
| CN | 113236389 A | * | 8/2021 | F01K 25/103 |
| CN | 113339088 A | * | 9/2021 | H02J 15/20 |
| CN | 115899540 A | | 4/2023 | |
| CN | 116641844 A | | 8/2023 | |

* cited by examiner

*Primary Examiner* — Abiy Teka

(57) ABSTRACT

A carbon dioxide energy storage system and a gas storage subsystem thereof are provided, which relates to the field of energy storage technologies. The carbon dioxide energy storage system further includes an energy storage assembly, an energy storage container and an energy release assembly sequentially connected in that order. The gas storage subsystem includes a pipeline structure and multiple gas storage assemblies; and at least one of the energy storage assembly and the energy release assembly is connected to the pipeline structure. The pipeline structure is connected to each gas storage assembly, to rebalance a gas flow rate and gas pressure flowing into or out of each gas storage assembly. The gas storage subsystem can improve the operation efficiency and maintainability of the carbon dioxide energy storage system.

16 Claims, 12 Drawing Sheets

CARBON DIOXIDE ENERGY STORAGE SYSTEM AND GAS STORAGE SUBSYSTEM THEREOF

CROSS-REFERENCE TO RELATED APPLICATION

This application claims priority to Chinese Patent Application No. 202411841851.9, filed on Dec. 13, 2024, which is herein incorporated by reference in its entirety.

TECHNICAL FIELD

The disclosure relates to the field of energy storage technologies, and more particularly to a carbon dioxide energy storage system and a gas storage subsystem thereof.

BACKGROUND

In a carbon dioxide energy storage system, a gas storage reservoir needs to provide carbon dioxide gas to an energy storage assembly of the carbon dioxide energy storage system, or receive carbon dioxide gas delivered by an energy release assembly. A pipeline arrangement between the gas storage reservoir and the energy storage assembly or between the gas storage reservoir and the energy release assembly has a great impact on an energy storage efficiency and safe operation of the carbon dioxide energy storage system.

It should be noted that the information disclosed in the above background is only used to enhance the understanding of the background of the disclosure, and therefore may include information that does not constitute the related art known to those skilled in the art.

SUMMARY

A purpose of the disclosure is to overcome the above disadvantages in the related art, to provide a carbon dioxide energy storage system and a gas storage subsystem thereof, thereby improving an operation efficiency and maintainability of the carbon dioxide energy storage system.

According to the first aspect of the disclosure, a gas storage subsystem applied to a carbon dioxide energy storage system is provided. The carbon dioxide energy storage system includes an energy storage assembly, an energy storage container and an energy release assembly sequentially connected in that order. The gas storage subsystem includes a pipeline structure and multiple gas storage assemblies. At least one of the energy storage assembly and the energy release assembly is connected to the pipeline structure. The pipeline structure is connected to each of the multiple gas storage assemblies, to rebalance a gas flow rate and gas pressure flowing into or out of each of the multiple gas storage assemblies.

According to an embodiment of the disclosure, each of the multiple gas storage assemblies includes a gas storage reservoir and a connection pipe. A first end of the connection pipe is connected to a gas storage space of the gas storage reservoir, and a second end of the connection pipe is connected to the pipeline structure. An exhaust mechanism is disposed on the connection pipe, and a cut-off valve is disposed between the exhaust mechanism and the second end of the connection pipe. The exhaust mechanism is configured to connect the gas storage space of the gas storage reservoir with an external space when the exhaust mechanism is opened. The cut-off valve is configured to make each of the multiple gas storage assemblies to be independently controlled to turn off or on.

According to an embodiment of the disclosure, the pipeline structure includes at least one trunk pipeline, the at least one trunk pipeline has multiple connection ports, and the multiple connection ports are connected to the second ends of the connection pipes of the multiple gas storage assemblies, respectively. At least adjacent two of the multiple connection ports of the at least one trunk pipeline are connected, to make inlet flow or outlet flow and pressure of corresponding two of the multiple gas storage assemblies connected to the at least adjacent two of the multiple connection ports more balanced.

According to an embodiment of the disclosure, the at least one trunk pipeline is annular.

According to an embodiment of the disclosure, an extension direction of a part of the at least one trunk pipeline connected to the multiple gas storage assemblies is perpendicular to a length direction of the gas storage reservoir of each of the connected gas storage assemblies, to thereby increase a number of the multiple gas storage assemblies connected to the at least one trunk pipeline.

According to an embodiment of the disclosure, the energy storage assembly includes at least one compression energy storage part. The energy release assembly includes at least one expansion energy release part. The pipeline structure further includes multiple device connection pipes corresponding to the at least one compression energy storage part and the at least one expansion energy release part in a one-to-one manner. An inlet of the at least one compression energy storage part is connected to the at least one trunk pipeline through a corresponding one of the multiple device connection pipes. An outlet of the at least one expansion energy release part is connected to the at least one trunk pipeline through another corresponding one of the multiple device connection pipes. The multiple device connection pipes are configured to simplify a pipeline layout of the energy storage assembly, the energy release assembly and the at least one trunk pipeline.

According to an embodiment of the disclosure, the energy storage assembly includes at least one compression energy storage part. The energy release assembly includes at least one expansion energy release part. The pipeline structure further includes a dispatch pipeline, and multiple device connection pipes corresponding to the at least one compression energy storage part and the at least one expansion energy release part in a one-to-one manner. An inlet of the at least one compression energy storage part is connected to the dispatch pipeline through a corresponding one of the multiple device connection pipes. An outlet of the at least one expansion energy release part is connected to the dispatch pipeline through another corresponding one of the multiple device connection pipes. The dispatch pipeline is connected to the at least one trunk pipeline.

According to an embodiment of the disclosure, the exhaust mechanism and the cut-off valve are located outside the gas storage, to facilitate operation and control of each of the multiple gas storage assemblies.

According to an embodiment of the disclosure, a flow regulation mechanism is further disposed on the connection pipe, and the flow regulation mechanism is located outside the gas storage reservoir.

According to the second aspect of the disclosure, a carbon dioxide energy storage system is provided, including the above gas storage subsystem.

It should be understood that the foregoing general description and the following detailed description are exemplary and explanatory only and are not restrictive of the disclosure.

BRIEF DESCRIPTION OF DRAWINGS

The drawings herein are incorporated into the specification and constitute a part of the specification, illustrate embodiments consistent with the disclosure, and together with the specification are used to explain principles of the disclosure. Apparently, the drawings described below are only some of the embodiments of the disclosure, and for those skilled in the art, other drawings can be obtained based on these drawings without creative work.

DESCRIPTION OF REFERENCE SIGNS

Figure 1:
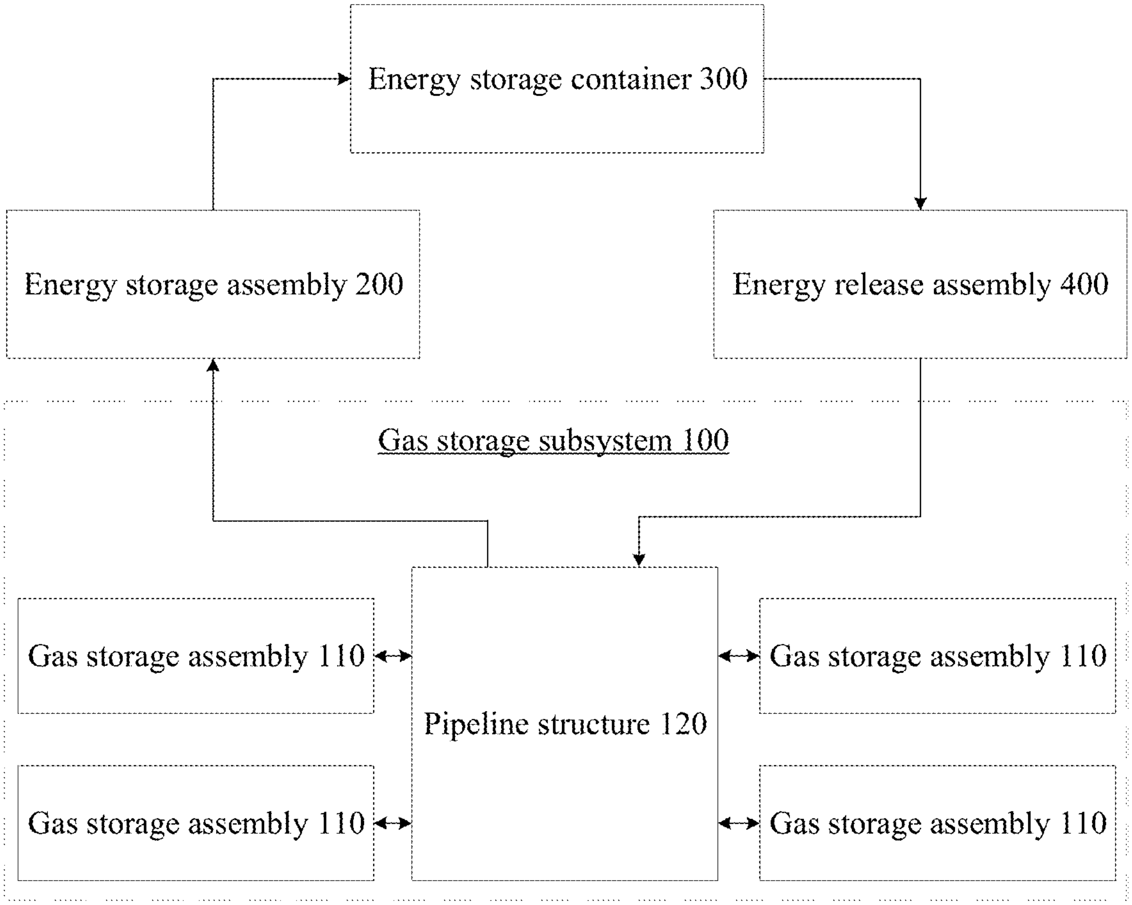
FIG. 1 illustrates a schematic principle diagram of a carbon dioxide energy storage system according to an embodiment of the disclosure.

100—gas storage subsystem; 110—gas storage assembly; 111—gas storage reservoir; 1111—gas storage space; 112—gas distribution pipe; 113—connection pipe; 113*a*—second end of the connection pipe; 114—exhaust mechanism; 115—flow regulation mechanism; 1151—branch pipe; 1152—first valve; 116—cut-off valve; 117—gas port; 120—pipeline structure; 121—trunk pipeline; 1211—connection port; 122—device connection pipe; 123—second valve; 124—dispatch pipeline; 125—buffer pipeline; 126—bypass pipeline; 200—energy storage assembly; 201—compression energy storage part; 21—compressor; 22—energy storage heat exchanger; 23—condenser; 300—energy storage container; 400—energy release assembly; 401—expansion energy release part; 41—turbine; 42—energy release heat exchanger; 43—evaporator.

DETAILED DESCRIPTION OF EMBODIMENTS

Exemplary embodiments will now be described more fully with reference to drawings. However, the exemplary embodiments can be implemented in a variety of forms and should not be construed as limited to the embodiments set forth herein; rather, these embodiments are provided so that the disclosure will be comprehensive and complete and fully convey concepts of the exemplary embodiments to those skilled in the art. The same reference signs in the drawings represent the same or similar structures, and thus their detailed description will be omitted. In addition, the drawings are only schematic illustrations of the disclosure and are not necessarily drawn to scale.

Although relative terms such as "upper" and "lower" are used in this specification to describe a relative relationship of one component of the illustration to another component, these terms are used in this specification only for convenience, such as according to the orientation of the examples described in the drawings. It is understood that if the device of the illustration is turned upside down, the component described as "upper" will become the component "lower". When a structure is "on" other structures, it may mean that the structure is formed integrally on the other structure, or that the structure is "directly" disposed on the other structure, or that the structure is "indirectly" disposed on the other structure through another structure.

Terms "a", "an", "this", "the" and "at least one" are used to indicate a presence of one or more elements/components/and the like. Terms "including" and "having" are used to express an open-ended inclusive meaning and mean that additional elements/components/and the like may exist in addition to the listed elements/components/and the like. Terms "first", "second" and "third" are used merely as labels and are not intended to limit the quantity of their objects.

The embodiments of the disclosure provide a carbon dioxide energy storage system. As shown in FIG. 1, the carbon dioxide energy storage system includes a gas storage subsystem 100, and the carbon dioxide energy storage system further includes an energy storage assembly 200, an energy storage container 300 and an energy release assembly 400 sequentially connected in that order. The gas storage subsystem 100 is connected to an inlet of the energy storage assembly 200, an outlet of the energy storage assembly 200 is connected to an inlet of the energy storage container 300, an outlet of the energy storage container 300 is connected to an inlet of the energy release assembly 400, and an outlet of the energy release assembly 400 is connected to the gas storage subsystem 100. The gas storage subsystem 100 can store gaseous carbon dioxide. The energy storage container 300 can store liquid carbon dioxide. The energy storage assembly 200 can compress the gaseous carbon dioxide from the gas storage subsystem 100 by using electricity, to achieve energy storage. The energy release assembly 400 can generate electricity by expanding the carbon dioxide from the energy storage container 300. The energy storage assembly 200 can also cool the compressed gaseous carbon dioxide, for example, cool the compressed gaseous carbon dioxide to condense into liquid carbon dioxide, or make the cooled gaseous carbon dioxide enter the energy storage container 300 to be condensed into the liquid carbon dioxide. The energy release assembly 400 can also heat the carbon dioxide, for example, evaporate the liquid carbon dioxide provided from the energy storage container 300 into gaseous carbon dioxide and heat it up, causing the heated gaseous carbon dioxide to expand and generate electricity, or heat the gaseous carbon dioxide pre-evaporated in the energy release assembly 400 to make the heated gaseous carbon dioxide to expand and generate electricity.

For example, in an energy storage stage, the energy storage assembly 200 can compress and condense the gaseous carbon dioxide from the gas storage subsystem 100, so that the gaseous carbon dioxide transforms into liquid carbon dioxide and is stored in the energy storage container 300. In an energy release stage, the energy release assembly 400 can evaporate the liquid carbon dioxide from the energy storage container 300 and generate electricity by expanding, so that the generated gaseous carbon dioxide is stored in the gas storage subsystem 100.

Figure 2:
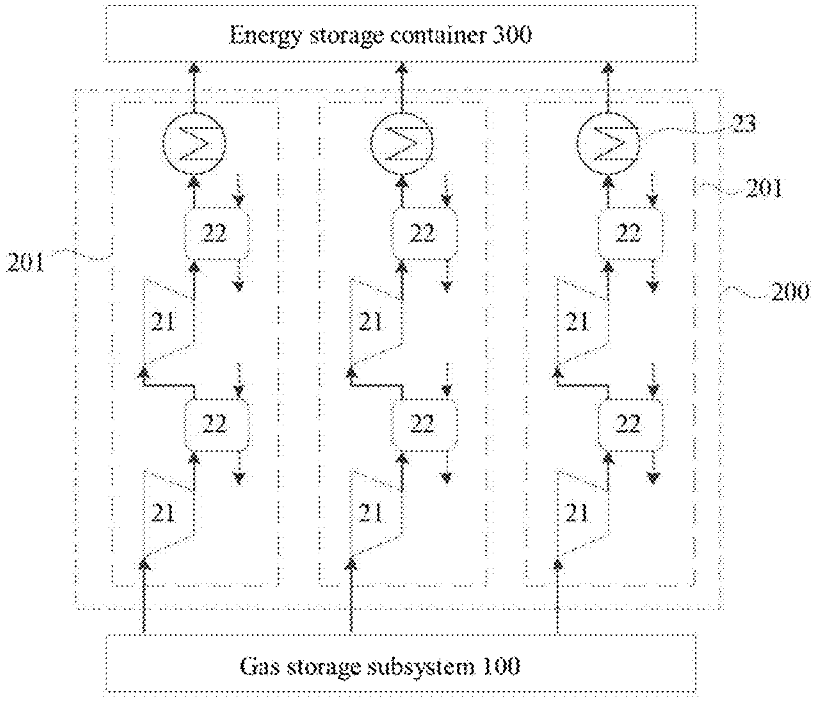
FIG. 2 illustrates a schematic structural diagram of an energy storage assembly of the carbon dioxide energy storage system according to an embodiment of the disclosure.

In an embodiment of the disclosure, as shown in FIG. 2, the energy storage assembly 200 includes at least one compression energy storage part 201. The compression energy storage part 201 includes a compressor 21 and an energy storage heat exchanger 22, and each compression energy storage part 201 is connected to the gas storage subsystem 100 and the energy storage container 300. Specifically, an inlet of each compression energy storage part 201 is connected to the gas storage subsystem 100, and an outlet of each compression energy storage part 201 is connected to the energy storage container 300. The compressor 21 can compress the gaseous carbon dioxide from the gas storage subsystem 100 under electric drive, and the compressed carbon dioxide can be heat exchanged and cooled in the energy storage heat exchanger 22.

In an example of FIG. 2, the energy storage assembly 200 includes three compression energy storage parts 201. It can be understood that, in other embodiments of the disclosure, a number of the compression energy storage parts 201 in the energy storage assembly 200 is not limited to three, for example, it can be 1 or multiple other quantities (such as 2, 4, 5, or 6).

In an embodiment of the disclosure, each compression energy storage part 201 includes a compression energy storage unit or multiple compression energy storage units sequentially cascaded. The compression energy storage unit can include a compressor 21 and an energy storage heat exchanger 22. An outlet of the compressor 21 is connected to a carbon dioxide inlet of the energy storage heat exchanger 22. In this way, after the gaseous carbon dioxide is compressed in the compressor 21, it flows into the energy storage heat exchanger 22 for heat exchange and cooling. When each compression energy storage part 201 includes multiple compression energy storage units sequentially cascaded, between two adjacent compression energy storage units, a carbon dioxide outlet of the energy storage heat exchanger 22 of a previous compression energy storage unit is connected to an inlet of the compressor 21 of a next compression energy storage unit. In the example of FIG. 2, each compression energy storage part 201 includes two compression energy storage units. It can be understood that the compression energy storage unit in the compression energy storage part 201 can be one, two, or more than two according to needs.

In the example of FIG. 2, a flow direction of the carbon dioxide in each compression energy storage part 201 is illustrated by solid arrows, and a flow direction of a cooling medium flowing through the energy storage heat exchanger 22 is illustrated by dashed arrows. In the energy storage heat exchanger 22, the compressed carbon dioxide with a higher temperature exchanges heat with the cooling medium with a lower temperature, which cools the carbon dioxide and facilitates its condensation into liquid carbon dioxide. The cooling medium absorbs heat and heats up to recover the heat generated during the compression process of carbon dioxide.

In an embodiment of the disclosure, an inlet of a first-stage compressor 21 of the compression energy storage part 201 is connected to the gas storage subsystem 100. It can be understood that when each compression energy storage part 201 has only one compression energy storage unit, the inlet of the compressor 21 of the compression energy storage part 201 is connected to the gas storage subsystem 100. Furthermore, a valve may be disposed between the inlet of the first-stage compressor 21 and the gas storage subsystem 100. In the carbon dioxide energy storage system illustrated in FIGS. 7 to 15, only the first-stage compressor 21 of the compression energy storage part 201 is shown, and each compressor 21 indicates that there is a corresponding compression energy storage part 201 in the carbon dioxide energy storage system.

In an embodiment of the disclosure, the compression energy storage unit 201 may further include a condenser 23, which is disposed between the last-stage compression energy storage unit and the energy storage container 300. In other words, a carbon dioxide outlet of a last-stage energy storage heat exchanger 22 may be connected to a carbon dioxide inlet of the condenser 23, and a carbon dioxide outlet of the condenser 23 may be connected to the inlet of the energy storage container 300. The condenser 23 may condense the carbon dioxide from the compression energy storage unit, so that the carbon dioxide from the compression energy storage unit is condensed into liquid carbon dioxide and stored in the energy storage container 300.

Figure 3:
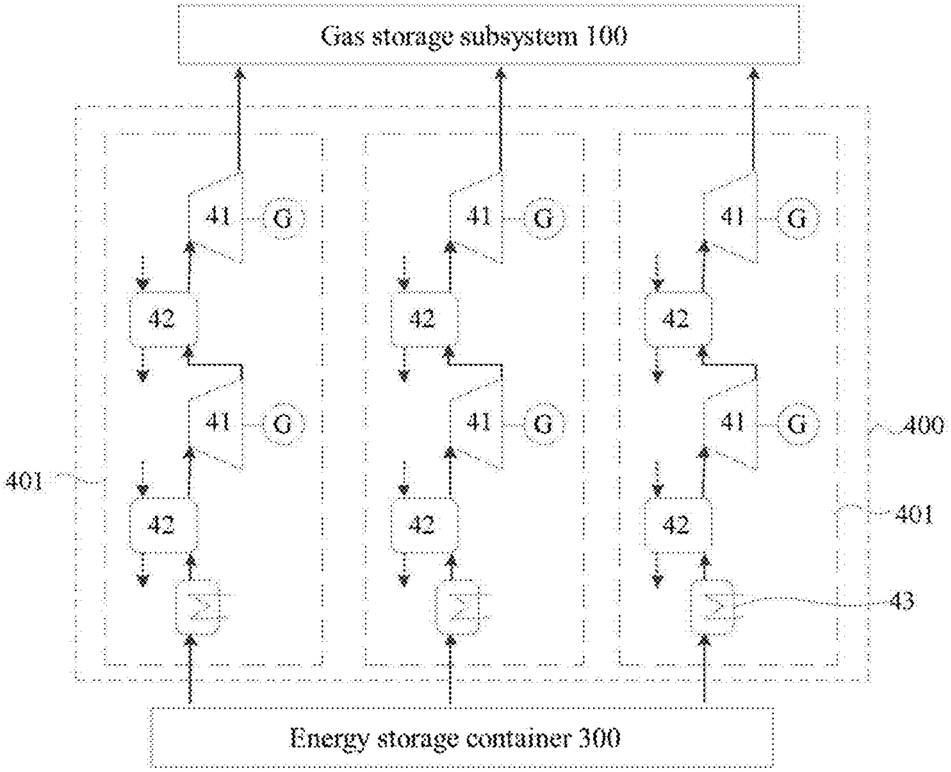
FIG. 3 illustrates a schematic structural diagram of an energy release assembly of the carbon dioxide energy storage system according to an embodiment of the disclosure.

In an embodiment of the disclosure, as shown in FIG. 3, the energy release assembly 400 includes at least one expansion energy release part 401. The expansion energy release part 401 includes a turbine 41 and an energy release heat exchanger 42, and each expansion energy release part 401 is connected to the gas storage subsystem 100 and the energy storage container 300. Specifically, an inlet of each expansion energy release part 401 is connected to the energy storage container 300, and an outlet of each expansion energy release part 401 is connected to the gas storage subsystem 100. The carbon dioxide from the energy storage container 300 can enter the turbine 41 after absorbing heat in the energy release heat exchanger 42, thereby driving a generator G to generate electricity.

In an example of FIG. 3, the energy release assembly 400 includes three expansion energy release parts 401. It can be understood that in other embodiments of the disclosure, the number of the expansion energy release parts 401 in the energy release assembly 400 is not limited to 3, for example, it can be 1, or other numbers (for example, 2, 4, 5 or 6).

In an embodiment of the disclosure, the expansion energy release part 401 includes one expansion energy release unit or multiple expansion energy release units cascaded in sequence. One expansion energy release unit may include a turbine 41 and an energy release heat exchanger 42. A carbon dioxide outlet of the energy release heat exchanger 42 is connected to an inlet of the turbine 41. In this way, after the carbon dioxide absorbs heat in the energy release heat exchanger 42, it flows into the turbine 41 to expand and generate electricity. When the expansion energy release part 401 includes multiple expansion energy release units cascaded in sequence, between two adjacent expansion energy release units, an outlet of the turbine 41 of a previous-stage expansion energy release unit is connected to a carbon dioxide inlet of the energy release heat exchanger 42 of a next-stage expansion energy release unit. In the example of FIG. 3, the expansion energy release part 401 includes two expansion energy release units. It can be understood that the expansion energy release unit in the expansion energy release part 401 can be one, or it can be two or more than two according to needs.

In the example of FIG. 3, a flow direction of the carbon dioxide in the expansion energy release part 401 is illustrated by solid arrows, and a flow direction of a heating medium flowing through the energy release heat exchanger 42 is illustrated by dashed arrows. In the energy release heat exchanger 42, the carbon dioxide that flows out of the energy storage container 300 and expands and cools down exchanges heat with the heating medium with a higher temperature, thereby heating the carbon dioxide, which can recover the cold energy generated by the expansion of the gaseous carbon dioxide.

In an embodiment of the disclosure, an outlet of the last-stage turbine 41 of the expansion energy release part 401 is connected to the gas storage subsystem 100. It can be understood that when the expansion energy release part 401 has only one expansion energy release unit, the outlet of the turbine 41 of the expansion energy release part 401 is connected to the gas storage subsystem 100. Optionally, a valve is disposed between the outlet of the last-stage turbine 41 of the expansion energy release part 401 and the gas storage subsystem 100. In the carbon dioxide energy storage system illustrated in FIGS. 7 to 15, only the last-stage turbine 41 of the expansion energy release part 401 is shown, and each turbine 41 indicates that there is a corresponding expansion energy release part 401.

In an embodiment of the disclosure, the expansion energy release part 401 may further include an evaporator 43, which is disposed between the first-stage expansion energy release unit and the energy storage container 300. In other words, a carbon dioxide inlet of the first-stage energy release heat exchanger 42 may be connected to a carbon dioxide outlet of the evaporator 43, and a carbon dioxide inlet of the evaporator 43 may be connected to the outlet of the energy storage container 300. The evaporator 43 may heat the liquid carbon dioxide from the energy storage container 300, so that the liquid carbon dioxide from the energy storage container 300 is evaporated into gaseous carbon dioxide and flows into the energy release heat exchanger 42.

It can be understood that in other embodiments of the disclosure, the carbon dioxide energy storage system may also be provided with other components. In an embodiment, the carbon dioxide energy storage system may also be provided with a heat recovery assembly, which includes a heat storage tank and a cold storage tank. In the energy storage stage, the energy storage heat exchanger 22 may exchange heat with the low-temperature medium (i.e., the cooling medium flowing into the energy storage heat exchanger 22) from the cold storage tank, so that the carbon dioxide in the energy storage heat exchanger 22 is cooled down, and the low-temperature medium is heated to a high-temperature medium and stored in the heat storage tank. In the energy release stage, the energy release heat exchanger 42 may exchange heat with the high-temperature medium (i.e., the heating medium flowing into the energy release heat exchanger 42) from the heat storage tank, so that the carbon dioxide in the energy release heat exchanger 42 is heated up, and the high-temperature medium is cooled to the low-temperature medium and stored in the cold storage tank. In the embodiment, the heating medium and the cooling medium are heat exchange media circulating between the heat storage tank and the cold storage tank, and the temperature states of the two are different.

In the examples of FIGS. 1 to 3, the number of the energy storage containers 300 is one. It can be understood that in the embodiments of the disclosure, the number of the energy storage containers 300 may also be multiple. When the number of the energy storage containers 300 is multiple, these energy storage containers 300 may be connected in series, or in parallel, or may be connected in a mixed manner of series and parallel.

In an embodiment of the disclosure, as shown in FIG. 1, the gas storage subsystem 100 includes a pipeline structure 120 and multiple gas storage assemblies 110 connected to the pipeline structure 120. The pipeline structure 120 is connected to at least one of the energy storage assembly 200 and the energy release assembly 400. For example, in the example of FIG. 1, the pipeline structure 120 is simultaneously connected to the inlet of the energy storage assembly 200 and the outlet of the energy release assembly 400. In this way, during the energy storage stage, the gaseous carbon dioxide stored in the gas storage assemblies 110 can flow into the energy storage assembly 200 through the pipeline structure 120. During the energy release stage, the gaseous carbon dioxide flowing out of the energy storage container 300 can flow into the gas storage assemblies 110 through the pipeline structure 120.

In the embodiment, the multiple gas storage assemblies 110 are connected to the pipeline structure 120. Therefore, when the multiple gas storage assemblies 110 provide gaseous carbon dioxide to the energy storage assembly 200, the pipeline structure 120 can rebalance the gas flow rate and gas pressure, which is conducive to maintaining a stable gas flow output of the gas storage subsystem 100 on the one hand, and on the other hand, it is conducive to balancing the gas flow rate of each gas storage assembly 110, so that the gas flow rate of each gas storage assembly 110 is generally consistent. This helps to improve the overall efficiency of the carbon dioxide energy storage system. Similarly, when the energy release assembly 400 provides gaseous carbon dioxide to multiple gas storage assemblies 110, the pipeline structure 120 can rebalance the gas flow rate and gas pressure, which is conducive to balancing the intake flow of each gas storage assembly 110, so that the intake flow of each gas storage assembly 110 is generally consistent.

In some embodiments of the disclosure, as shown in FIGS. 4 to 15, each gas storage assembly 110 includes a gas storage reservoir 111 and a connection pipe 113. A first end of the connection pipe 113 is connected to a gas storage space 1111 of the gas storage reservoir 111, and a second end 113*a* of the connection pipe is connected to the pipeline structure 120. An exhaust mechanism 114 is disposed on the connection pipe 113, and a cut-off valve 116 is disposed between the exhaust mechanism 114 and the second end 113*a* of the connection pipe. The exhaust mechanism 114 can make the gas storage space 1111 of the gas storage reservoir 111 connect with an external space when it is opened. At least one of the energy storage assembly 200 and the energy release assembly 400 is connected to the pipeline structure 120.

In the embodiment, the cut-off valve 116 can be opened or closed. When the cut-off valve 116 is opened, gas distribution pipes 112 can be connected to the pipeline structure 120 through the connection pipe 113, so that the gaseous carbon dioxide can flow into or out of the gas storage assembly 110. When the cut-off valve 116 is closed, the connection pipe 113 can be cut off, so that the gas storage space 1111 of the gas storage reservoir 111 is disconnected from the pipeline structure 120. In particular, when the gas storage assembly 110 needs maintenance, the gas storage assembly 110 can be isolated from the carbon dioxide energy storage system by closing the cut-off valve 116, so that the operation of the carbon dioxide energy storage system is not affected during the maintenance of the gas storage assembly 110. Optionally, the cut-off valve 116 is disposed outside a scope of the gas storage reservoir 111 to facilitate the control and maintenance of the cut-off valve 116, and further improve the maintainability of the gas storage assembly 110.

In the embodiment, on the gas path, the cut-off valve 116 is located between the exhaust mechanism 114 and the second end 113*a* of the connection pipe 113. When the exhaust mechanism 114 is opened, the connection pipe 113 can be directly connected to the outside, for example, to the external air space. At this time, if there is gaseous carbon dioxide in the gas storage space 1111 of the gas storage reservoir 111, the gaseous carbon dioxide can be discharged through the exhaust mechanism 114. As an application mode, when the gas storage assembly 110 needs maintenance, the cut-off valve 116 can be closed to isolate the gas storage assembly 110 from the gas path of the carbon dioxide energy storage system, and the exhaust mechanism 114 can be opened to discharge the gaseous carbon dioxide in the gas storage space 1111 of the gas storage reservoir 111 or replace the gas in the gas storage space 1111 of the gas storage reservoir 111. Optionally, in a normal working mode of the gas storage assembly 110, the exhaust mechanism 114 can remain closed. In an embodiment, the exhaust mechanism 114 can be set outside the scope of the gas storage reservoir 111.

Therefore, in the embodiment, the gas storage subsystem 100 can not only balance the inlet flow or outlet flow of each gas storage assembly 110 through the pipeline structure 120, but also isolate each gas storage assembly 110 from the carbon dioxide energy storage system during maintenance without affecting the operation of the carbon dioxide energy storage system. In this way, the gas storage subsystem 100 can have higher operating efficiency and higher maintainability.

Figure 4:
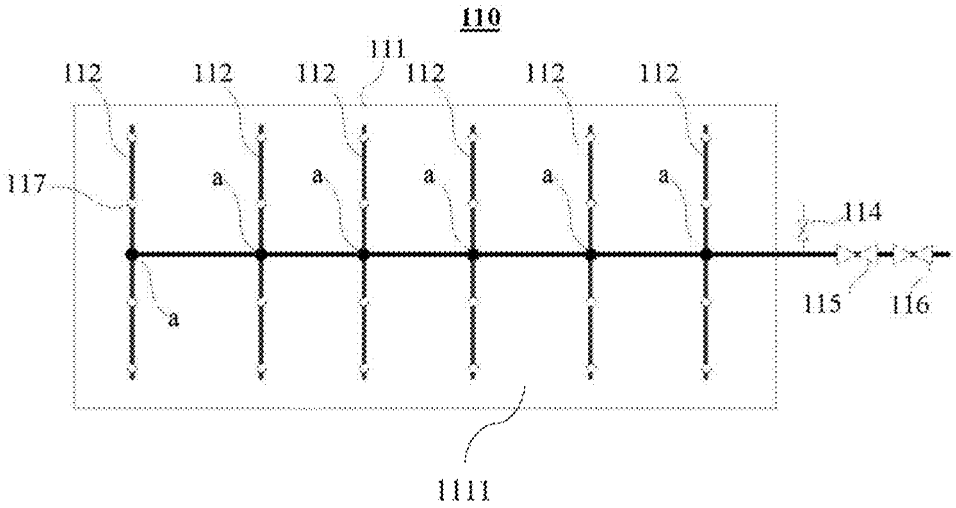
FIG. 4 illustrates a schematic structural diagram of a gas storage assembly of a gas storage subsystem according to an embodiment of the disclosure.
Figure 5:
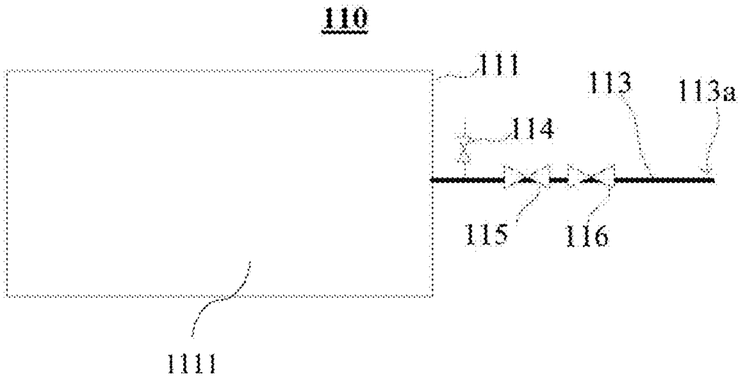
FIG. 5 illustrates another schematic structural diagram of the gas storage assembly of the gas storage subsystem according to an embodiment of the disclosure.

In some embodiments of the disclosure, as shown in FIG. 4 and FIG. 5, the gas storage assembly 110 includes a gas storage reservoir 111, gas distribution pipes 112, and a connection pipe 113. Each gas distribution pipe 112 has multiple gas ports 117 connected to the gas storage space 1111 of the gas storage reservoir 111. The first end of the connection pipe 113 is connected to the gas distribution pipes 112, and the second end 113*a* of the connection pipe 113 is used to connect to the pipeline structure 120. Optionally, the second end 113*a* of the connection pipe 113 is located outside the scope of the gas storage reservoir 111. In the embodiment, each gas distribution pipe 112 has multiple gas ports 117 connected to the gas storage space 1111 of the gas storage reservoir 111. In the energy storage stage, the gaseous carbon dioxide in the gas storage space 1111 of the gas storage reservoir 111 can enter the gas distribution pipes 112 through the gas ports 117, and then flow into the energy storage assembly 200 through the gas distribution pipes 112, the connection pipe 113, and the pipeline structure 120. In the energy release stage, the gaseous carbon dioxide provided to the pipeline structure 120 by the energy release assembly 400 can enter the gas storage space 1111 of the gas storage reservoir 111 through the connection pipe 113, the gas distribution pipes 112 and the gas ports 117. In an embodiment, a distance between a connection position a between each gas distribution pipe 112 and the connection pipe 113 and an end of the gas distribution pipe 112 is 45% to 50% of a length of the gas distribution pipe 112, and in particular, can be 48% to 50%.

In an embodiment of the disclosure, the gas distribution pipes 112 may be located below the gas storage reservoir 111, for example, the gas distribution pipes 112 may be buried below the gas storage reservoir 111. A lower end of each gas port 117 is connected to the gas distribution pipe 112, and an upper end of the gas port 117 passes through a ground membrane of the gas storage reservoir 111 and extends into the gas storage space 1111 of the gas storage reservoir 111. In an embodiment, the gas port 117 may be a riser, a lower end of the riser is connected to the gas distribution pipe 112, and an upper end of the riser extends into the gas storage space 1111. On the one hand, the gas distribution pipes 112 and a main structure of each gas port 117 (i.e., a main part of the riser) is located below the gas storage reservoir 111, for example, buried below the ground membrane of the gas storage reservoir 111, which is conducive to the fastening and shock absorption of the gas distribution pipes 112 and the gas ports 117. On the other hand, this can reduce the support and fixation of the gas distribution pipes 112 in the gas storage space 1111 of the gas storage reservoir 111, which is conducive to improving the gas tightness of the gas storage reservoir 111.

In an example of FIG. 4, the connection pipe 113 of the gas storage assembly 110 extends out of the gas storage reservoir 111 from a short edge side of the gas storage reservoir 111. It can be understood that in other embodiments of the disclosure, the connection pipe 113 of the gas storage assembly 110 may also extend out of the gas storage reservoir 111 from a long edge side of the gas storage reservoir 111.

In an embodiment of the disclosure, as shown in FIGS. 4 to 15, a flow regulation mechanism 115 may be further disposed on the connection pipe 113, and the flow regulation mechanism 115 may control the flow of the gaseous carbon dioxide flowing through the connection pipe 113. In particular, when the carbon dioxide energy storage system has multiple gas storage assemblies 110, the inlet flow or outlet flow of each gas storage assembly 110 may be regulated by regulating the flow regulation mechanism 115 of each gas storage assembly 110, so that the inlet flow or outlet flow of each gas storage assembly 110 is substantially consistent. Optionally, the flow regulation mechanism 115 may be located outside the scope of the gas storage reservoir 111 to facilitate the control and maintenance of the flow regulation mechanism 115.

In an embodiment, the flow regulation mechanism 115 may be a flow regulation valve, such as a shutter valve.

Figure 6:
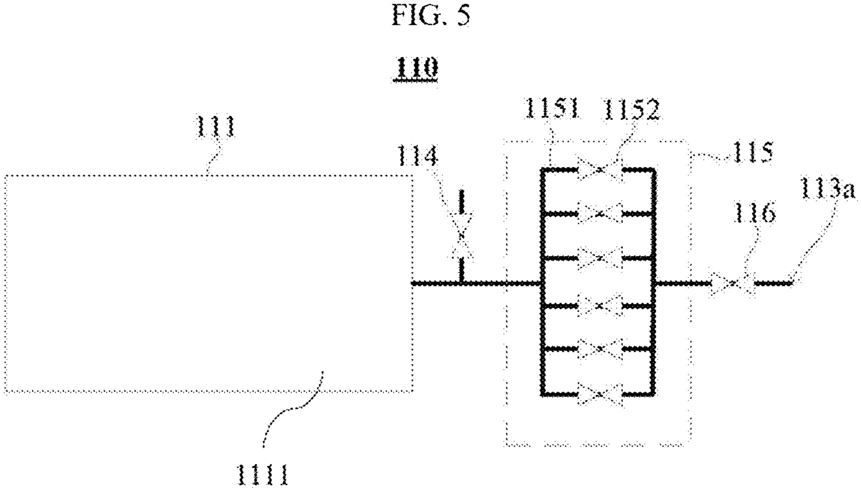
FIG. 6 illustrates still another schematic structural diagram of the gas storage assembly of the gas storage subsystem according to an embodiment of the disclosure.

In some other embodiments, as shown in FIG. 6, the flow regulation mechanism 115 may have multiple branch pipes 1151 arranged side by side, and each branch pipe 1151 is provided with a first valve 1152. The connection pipe 113 is divided into two sections at the flow regulation mechanism 115, and one section is connected to the other section by the branch pipe 1151. A sum of cross-sectional areas of the branch pipes 1151 is not less than a cross-sectional area of the connection pipe 113. Thus, when the first valve 1152 on the branch pipe 1151 is closed, the branch pipe 1151 is shut off. When the first valve 1152 on the branch pipe 1151 is opened, the branch pipe 1151 is turned on. The flow of the gaseous carbon dioxide flowing through the connection pipe 113 can be controlled by controlling the number of the branch pipes 1151 that are turned on. Optionally, a diameter of each branch pipe 1151 is 0.4 to 0.5 times a diameter of the connection pipe 113, and the sum of the cross-sectional areas of the branch pipes 1151 is 1.2 to 1.5 times the cross-sectional area of the connection pipe 113.

In the examples of FIGS. 4 to 15, the flow regulation mechanism 115 is disposed between the cut-off valve 116 and the exhaust mechanism 114. It can be understood that in other embodiments of the disclosure, the flow regulation mechanism 115 may also be disposed at other positions, such as on a side of the exhaust mechanism 114 facing away from the cut-off valve 116, or on a side of the cut-off valve 116 facing away from the exhaust mechanism 114.

In an embodiment of the disclosure, as shown in FIGS. 7 to 15 (the energy storage container 300 is not shown, and only part of the compressors 21 of the energy storage assembly 200 and part of the turbines 41 of the energy release assembly 400 are shown), the pipeline structure 120 includes at least one trunk pipeline 121, the trunk pipeline 121 has multiple connection ports 1211, and the connection ports 1211 are connected to the second end 113*a* of the connection pipe 113 of the gas storage assembly 110. At least two adjacent connection ports 1211 of the trunk pipeline 121 are connected. In this way, two adjacent gas storage assemblies 110 can be connected to each other through the trunk pipeline 121. The two adjacent gas storage assemblies 110 can achieve rebalancing of the outlet flow and pressure by means of the trunk pipeline 121 during the energy storage stage, and improve the synchronization of the inner membrane descent of the adjacent gas storage reservoirs 111. The two adjacent gas storage assemblies 110 can achieve rebalancing of the inlet flow and pressure by means of the trunk pipeline 121 during the energy release stage, and improve the synchronization of the inner membrane lifting of the adjacent gas storage reservoirs 111.

In an embodiment of the disclosure, the at least one trunk pipeline 121 is annular. For example, in the examples of FIGS. 7 to 15, the pipeline structure 120 includes an annular trunk pipeline 121, and the second end 113*a* of the connection pipe of each gas storage assembly 110 is connected to the annular trunk pipeline 121. It can be understood that in the embodiments of the disclosure, the number of the trunk pipelines 121 is not limited to one, and can also be set to multiple as needed, such as two, three, four or five. It can also be understood that in the embodiments of the disclosure, the shape of the trunk pipeline 121 is not limited to annular, for example, it can be linear or topological. For instance, in an embodiment, the pipeline structure 120 may include two or three trunk pipelines 121 arranged in a straight line, and each trunk pipeline 121 is connected to multiple gas storage assemblies 110. The shapes of the multiple trunk pipelines 121 may be the same or different, and may be a straight line, a ring, or a broken line. An extension directions of the multiple straight-line trunk pipelines 121 may also be different. The multiple trunk pipelines 121 may be interdependently connected in a branched, radial, or meshed shape.

In the examples of FIGS. 7 to 15, the trunk pipeline 121 of the pipeline structure 120 is a rectangular ring, which includes two long side pipelines arranged oppositely and two short side pipelines arranged oppositely. It can be understood that in other embodiments of the disclosure, the trunk pipeline 121 can be presented as a ring of other shapes, such as a hexagon, a pentagon or an irregular ring.

In an embodiment of the disclosure, the shape of the trunk pipeline 121 can be adjusted according to the shape of at least part of the gas storage assemblies 110. For example, an extension direction of a part of the trunk pipeline 121 connected to the gas storage assemblies 110 is perpendicular to a length direction (i.e., a direction along a length of the gas storage reservoir 111) of the gas storage reservoir 111 of each connected gas storage assemblies 110. In this way, the trunk pipeline 121 can be connected to more gas storage assemblies 110, thereby reducing the cost of the carbon dioxide energy storage system.

In an embodiment of the disclosure, the pipeline structure 120 also includes device connection pipes 122 corresponding to each compression energy storage part 201 and expansion energy release part 401 in a one-to-one manner. The inlet of the compression energy storage part 201 is connected to the trunk pipeline 121 through a corresponding device connection pipe 122. The outlet of the expansion energy release part 401 is connected to the trunk pipeline 121 through the corresponding device connection pipe 122. In the embodiment, the compression energy storage part 201 and the expansion energy release part 401 can be directly connected to the trunk pipeline 121 through the device connection pipes 122, and the pipeline is simple and convenient to construct, which is conducive to reducing the pipeline layout cost of the pipeline structure 120. Furthermore, a second valve 123 is disposed on each device connection pipe 122. When the second valve 123 is opened, the device connection pipe 122 is turned on, and the compression energy storage part 201 or the expansion energy release part 401 connected to the device connection pipe 122 can be connected to the trunk pipeline 121. When the second valve 123 is closed, the device connection pipe 122 is cut off, and the compression energy storage part 201 or the expansion energy release part 401 connected to the device connection pipe 122 can be disconnected from the trunk pipeline 121. In this way, according to the actual working conditions, an appropriate number of the compression energy storage parts 201 can be selected to work for energy storage in the energy storage stage, or an appropriate number of the expansion energy release parts 401 can be selected to work for power generation in the energy release stage. This can more finely adjust the energy storage power and the power generation power.

Figure 7:
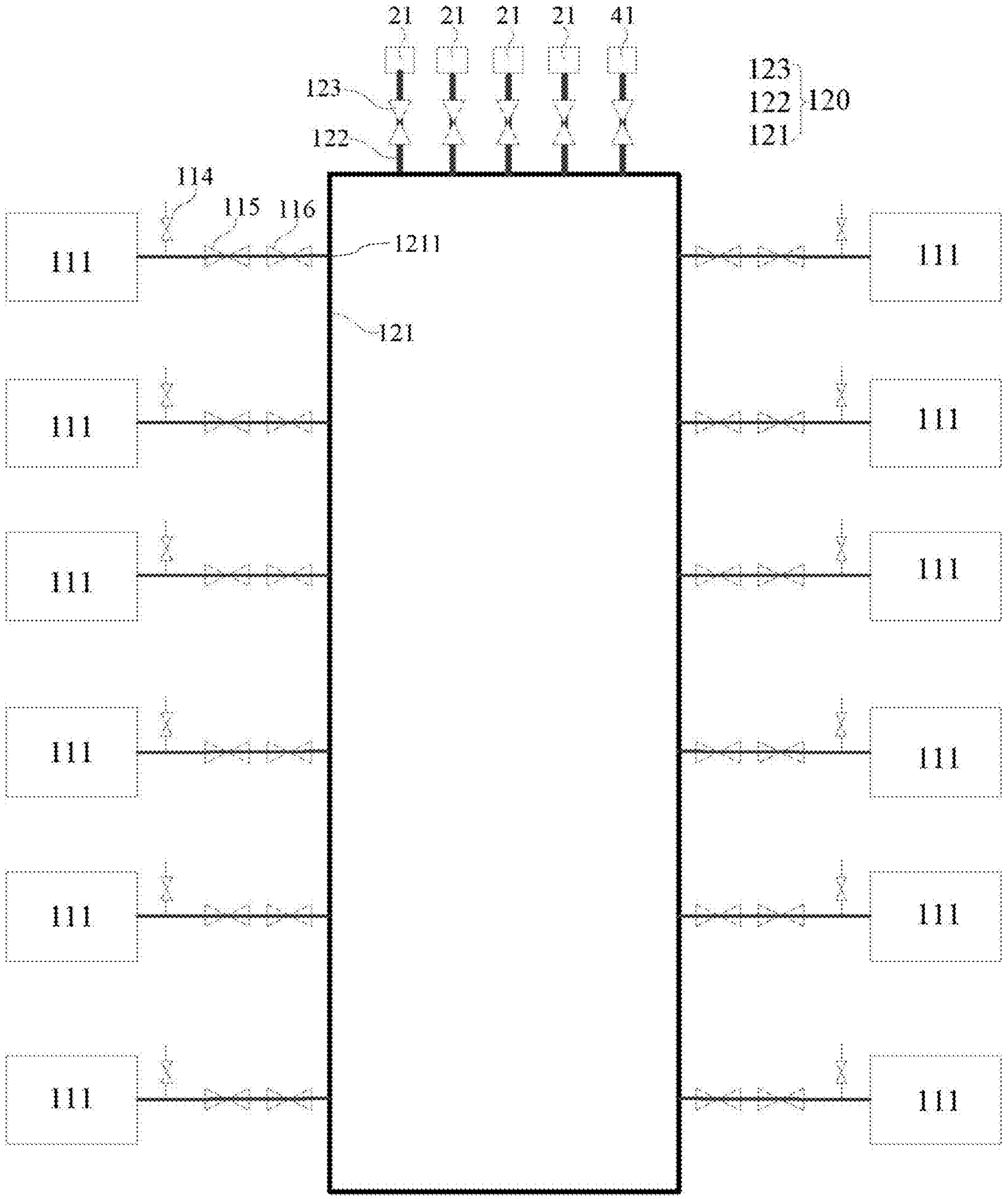
FIG. 7 illustrates a first schematic structural diagram of the carbon dioxide energy storage system according to an embodiment of the disclosure.

For example, in the carbon dioxide energy storage system illustrated in FIG. 7, the compression energy storage part 201 and the expansion energy release part 401 are respectively connected to a short side pipeline of the trunk pipeline 121 through corresponding device connection pipes 122, and the energy storage assembly 200, the energy storage container 300 and the energy release assembly 400 are relatively concentrated and effectively isolated from the gas storage assemblies 110, which is beneficial to the maintenance and operation of the carbon dioxide energy storage system.

Figure 14:
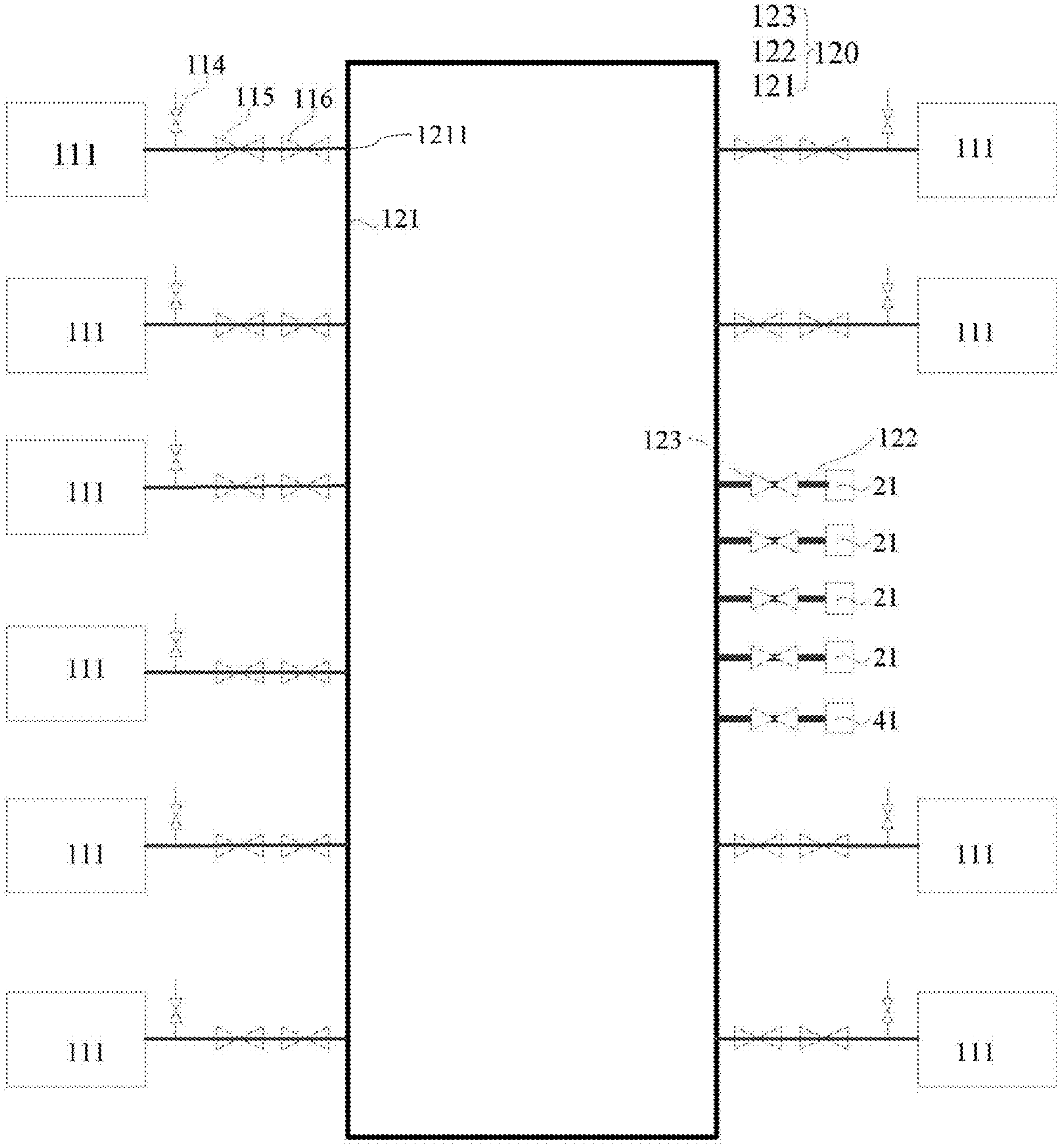
FIG. 14 illustrates an eighth schematic structural diagram of the carbon dioxide energy storage system according to an embodiment of the disclosure.

For another example, in the carbon dioxide energy storage system illustrated in FIG. 14, the compression energy storage part 201 and the expansion energy release part 401 are connected to a long side pipeline of the trunk pipeline 121 through the corresponding device connection pipes 122. In the example of FIG. 14, the energy storage assembly 200 and the energy release assembly 400 are arranged near a middle of the long side pipeline of the trunk pipeline 121, and the gas storage assemblies 110 are arranged on both sides thereof. It can be understood that, as required, the energy storage assembly 200 and the energy release assembly 400 can also be arranged near the end of the long side pipeline of the trunk pipeline 121.

Figure 15:
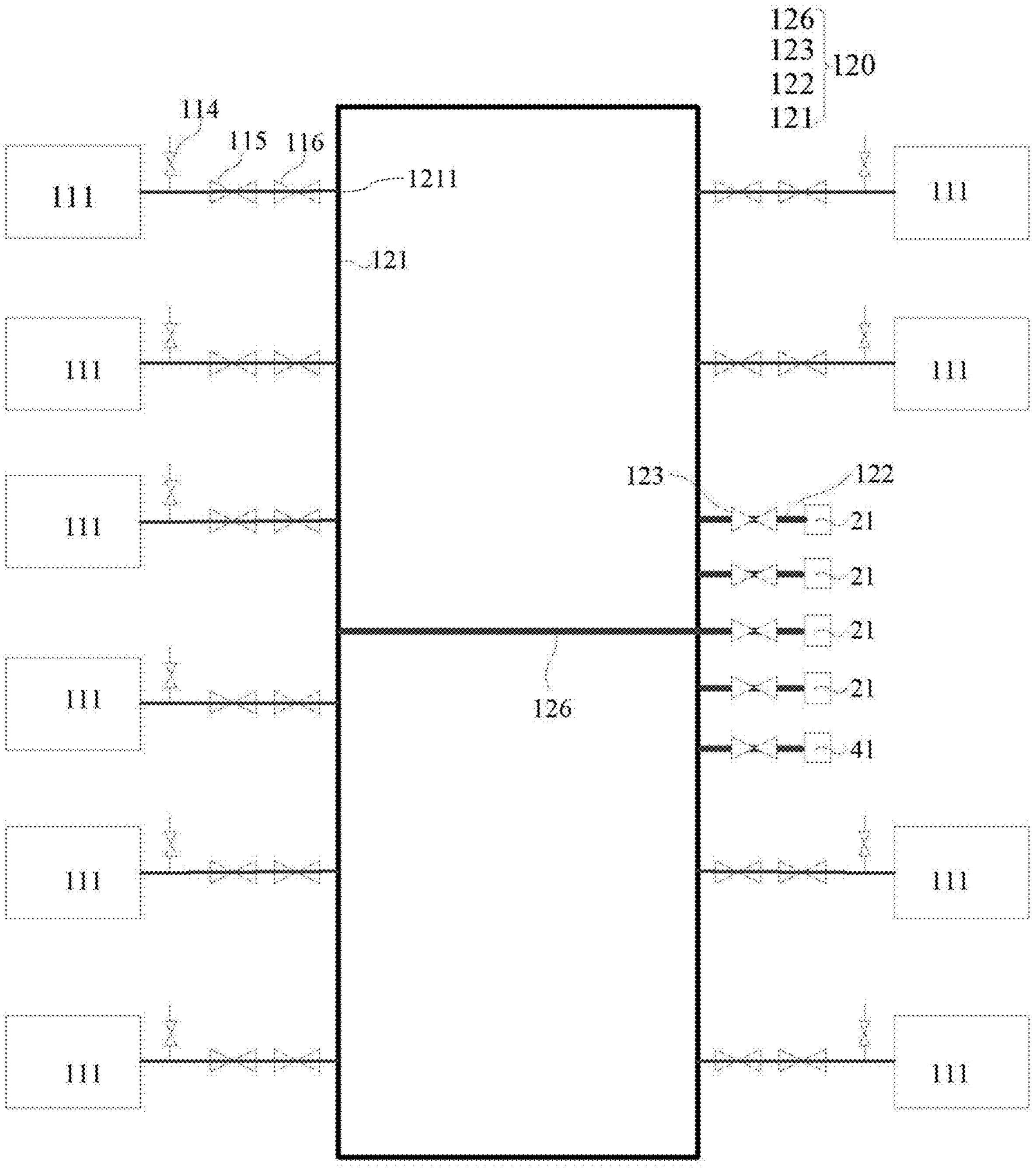
FIG. 15 illustrates a ninth schematic structural diagram of the carbon dioxide energy storage system according to an embodiment of the disclosure.

For another example, in the carbon dioxide energy storage system illustrated in FIG. 15, the pipeline structure 120 further includes a bypass pipeline 126, which connects the middle parts of the two long side pipelines of the trunk pipeline 121. In this way, the trunk pipeline 121 and the bypass pipeline 126 are interconnected to form a pipeline network, further improving the rebalancing capability of the gas pressure and gas flow of the pipeline structure 120, and can effectively reduce the gas resistance of the pipeline structure 120.

In some other embodiments of the disclosure, the compression energy storage part 201 and the expansion energy release part 401 may also be directly connected to the trunk pipeline 121 without the device connection pipes 122. In an embodiment of the disclosure, in addition to the device connection pipes 122 (the device connection pipes 122 are provided with second valves 123) corresponding to each compression energy storage part 201 and each expansion energy release part 401, the pipeline structure 120 may also be provided with a dispatch pipeline 124 and a buffer pipeline 125. The dispatch pipeline 124 is connected to the trunk pipeline 121 through the buffer pipeline 125, and each device connection pipe 122 is connected to the dispatch pipeline 124. In this way, the influence of the position difference of each compression energy storage part 201 on the dispatch pipeline 124 and the influence of the position difference of each gas storage assembly 110 on the trunk pipeline 121 are isolated by the buffer pipeline 125. The influence of the position difference of each expansion energy release part 401 on the dispatch pipeline 124 and the influence of the position difference of each gas storage assembly 110 on the trunk pipeline 121 are isolated by the buffer pipeline 125. In the embodiment, in the energy storage stage, the gaseous carbon dioxide from each gas storage assembly 110 is collected to the buffer pipeline 125 through the trunk pipeline 121, and then distributed to the compression energy storage parts 201 that needs the gaseous carbon dioxide through the dispatch pipeline 124. In this process, the buffer pipeline 125 isolates the difference in gas supply flow and position distribution of each gas storage assembly 110 on the trunk pipeline 121 through the collection effect, and can provide a relatively uniform intake gas flow to the dispatch pipeline 124, thereby facilitating a more uniform intake gas flow of each compression energy storage part 201. In other words, the setting of the buffer pipeline 125 makes it possible to filter out the position differences and gas resistance differences between different compression energy storage parts 201 and each gas storage assembly 110, which is beneficial to the control of each compression energy storage part 201 and the balance of the outlet flow of each gas storage assembly 110. Similarly, in the energy release stage, the gaseous carbon dioxide from each expansion energy release part 401 is first collected into the buffer pipeline 125 through the dispatch pipeline 124, and then flows into the trunk pipeline 121 through the buffer pipeline 125 and is distributed to each gas storage assembly 110. The setting of the buffer pipeline 125 makes it possible to filter out the position differences and gas resistance differences between different expansion energy release parts 401 and each gas storage assembly 110, which is beneficial to the balance of the inlet flow of each gas storage assembly 110.

Figure 8:
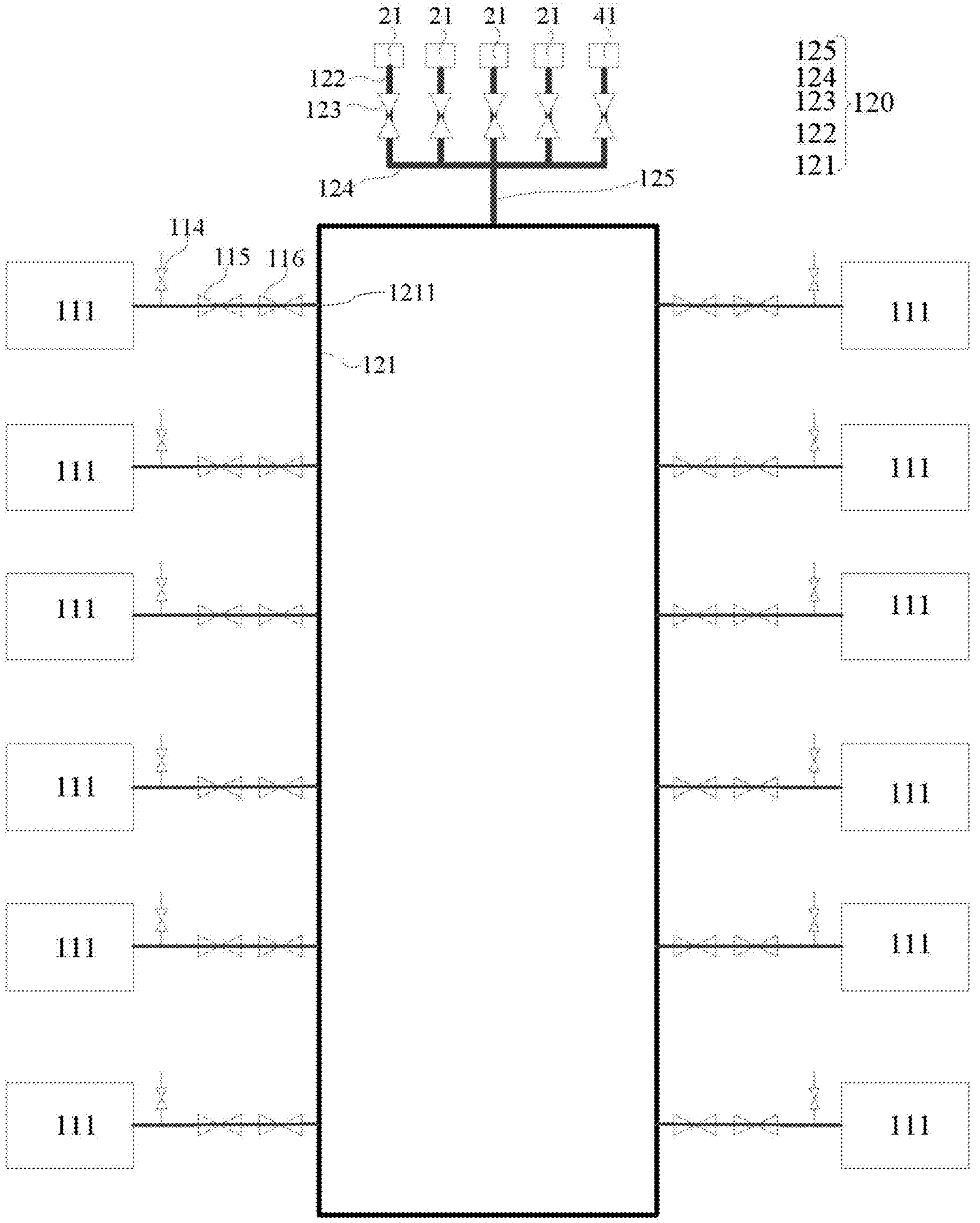
FIG. 8 illustrates a second schematic structural diagram of the carbon dioxide energy storage system according to an embodiment of the disclosure.

For example, in the carbon dioxide energy storage system illustrated in FIG. 8, in addition to the device connection pipes 122 (the device connection pipes 122 are provided with second valves 123) corresponding to each compression energy storage part 201 and each expansion energy release part 402, the pipeline structure 120 may also be provided with a dispatch pipeline 124 and a buffer pipeline 125. The dispatch pipeline 124 is connected to the short side pipeline of the trunk pipeline 121 through the buffer pipeline 125, and each device connection pipe 122 is connected to the dispatch pipeline 124.

Figure 12:
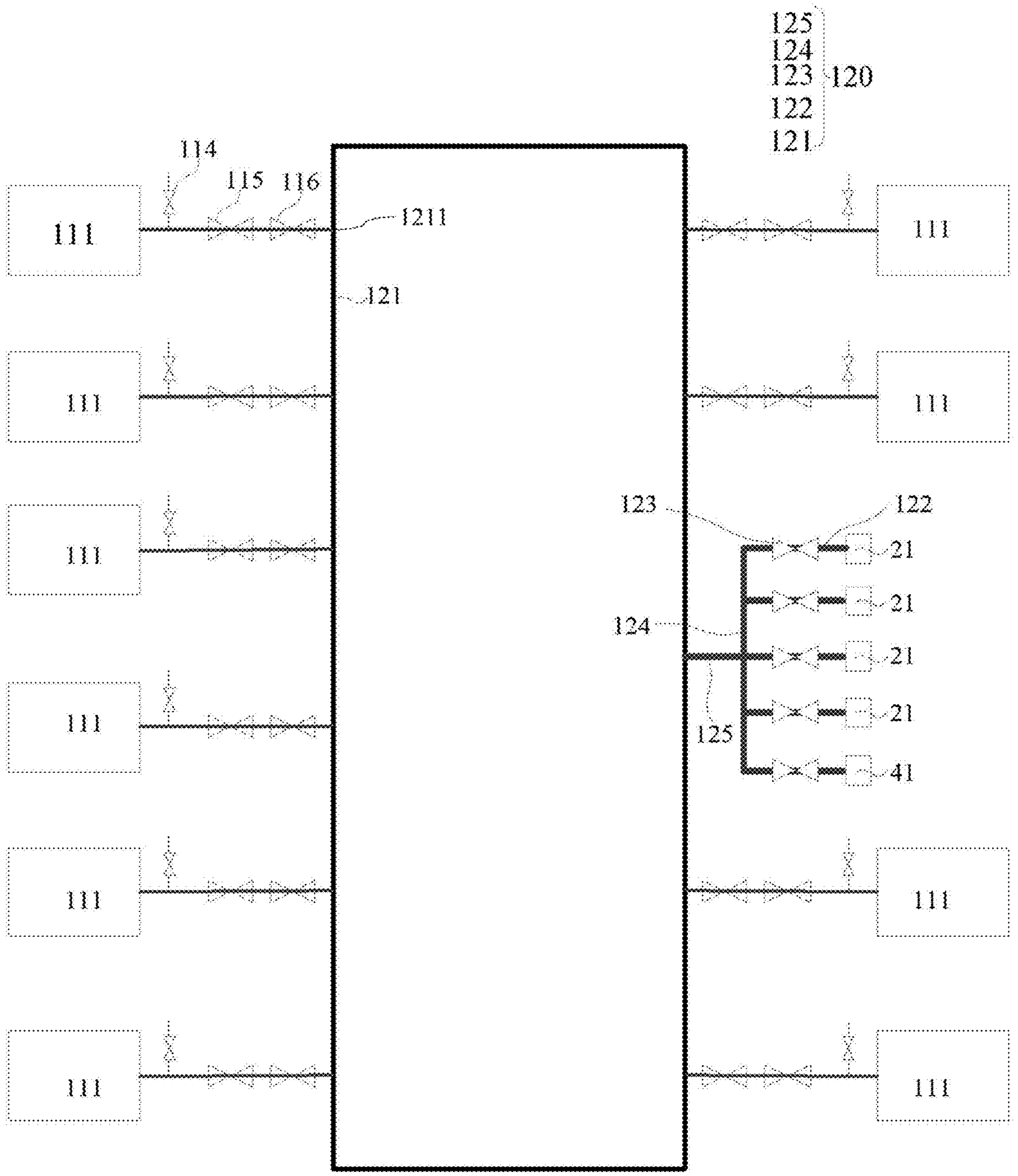
FIG. 12 illustrates a sixth schematic structural diagram of the carbon dioxide energy storage system according to an embodiment of the disclosure.

For another example, in the carbon dioxide energy storage system illustrated in FIG. 12, in addition to the device connection pipes 122 (the device connection pipes 122 are provided with second valves 123) corresponding to each compression energy storage part 201 and each expansion energy release part 402, the pipeline structure 120 may also be provided with a dispatch pipeline 124 and a buffer pipeline 125. The dispatch pipeline 124 is connected to the long side pipeline of the trunk pipeline 121 through the buffer pipeline 125, and each device connection pipe 122 is connected to the dispatch pipeline 124.

Figure 13:
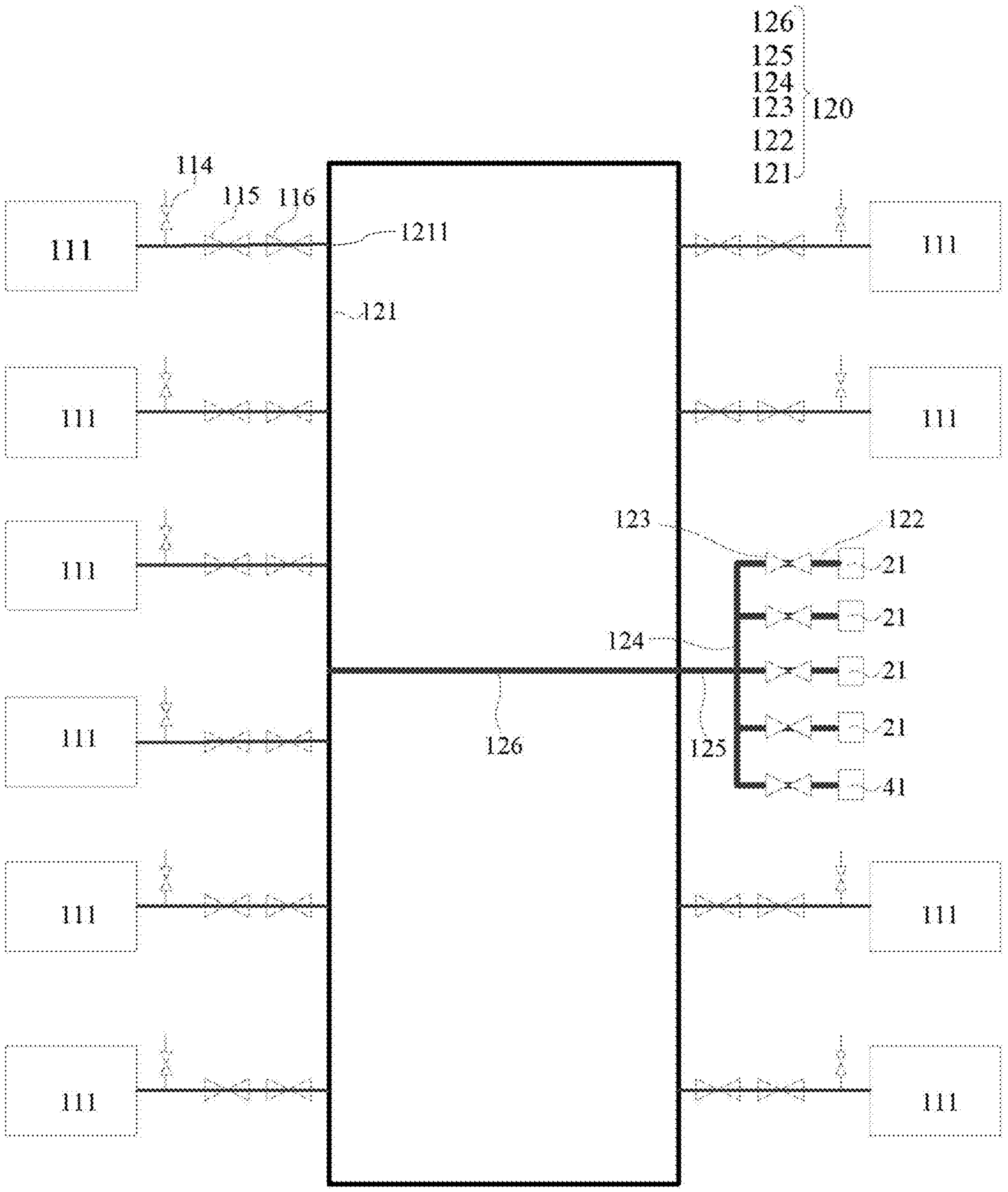
FIG. 13 illustrates a seventh schematic structural diagram of the carbon dioxide energy storage system according to an embodiment of the disclosure.

For another example, in the carbon dioxide energy storage system illustrated in FIG. 13, in addition to the device connection pipes 122 (the device connection pipes 122 are provided with second valves 123) corresponding to each compression energy storage part 201 and each expansion energy release part 402, the pipeline structure 120 may also be provided with a dispatch pipeline 124, a buffer pipeline 125, and a bypass pipeline 126. The dispatch pipeline 124 is connected to the long side pipeline of the trunk pipeline 121 through the buffer pipeline 125, and each device connection pipe 122 is connected to the dispatch pipeline 124. The bypass pipeline 126 is connected to the two long side pipelines of the trunk pipeline 121.

In the above embodiments, the energy storage assembly 200 and the energy release assembly 400 are directly connected to the trunk pipeline 121 through the device connection pipes 122, or are connected to the trunk pipeline 121 through the device connection pipes 122, the dispatch pipeline 124 and the buffer pipeline 125. In some other embodiments of the disclosure, when the pipeline structure 120 is provided with the bypass pipeline 126, the energy storage assembly 200 and the energy release assembly 400 can be directly connected to the bypass pipeline 126 through the device connection pipes 122, or are connected to the bypass pipeline 126 through the device connection pipes 122, the dispatch pipeline 124 and the buffer pipeline 125. Specifically, the pipeline structure 120 includes the trunk pipeline 121, the device connection pipes 122, and the bypass pipeline 126. The two long side pipelines of the trunk pipeline 121 are connected by the bypass pipeline 126. Each compression energy storage part 201 is directly or indirectly connected to the bypass pipeline 126 through the corresponding device connection pipe 122. Each expansion energy release part 401 is connected to the bypass pipeline 126 through the corresponding device connection pipe 122. Compared with the trunk pipeline 121, the position difference between each gas storage assembly 110 and the bypass pipeline 126 is smaller, which is conducive to more uniform inlet flow or outlet flow of each gas storage assembly 110.

In an embodiment, a distance between a connection position between the long side pipeline of the trunk pipeline 121 and the bypass pipeline 126 and an end of the long side pipeline of the trunk pipeline 121 is 40% to 60% of a length of the long side pipe of the trunk pipeline 121, especially 45 to 55%, in an embodiment, it is 50%.

Figure 10:
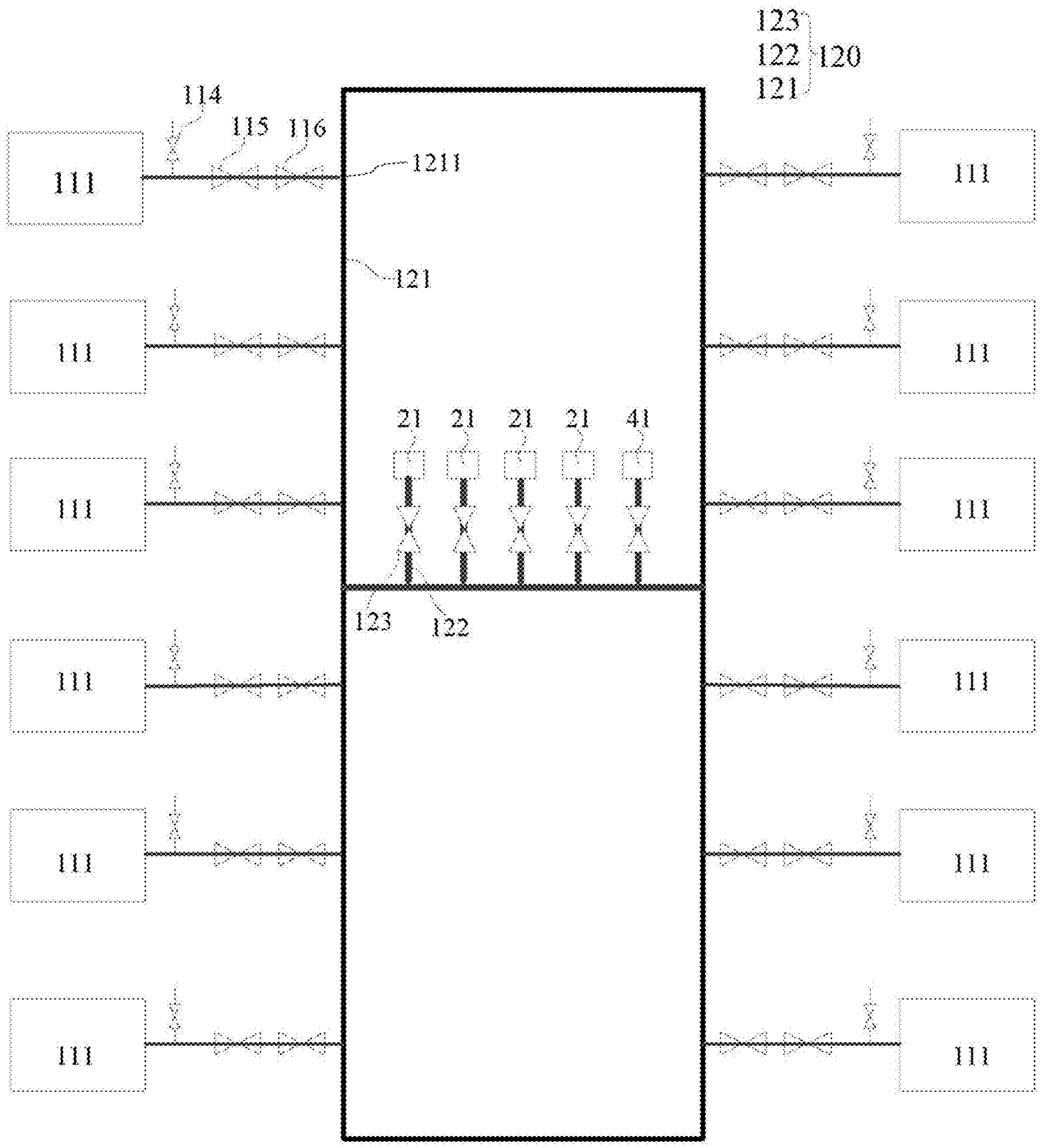
FIG. 10 illustrates a fourth schematic structural diagram of the carbon dioxide energy storage system according to an embodiment of the disclosure.

For example, in the carbon dioxide energy storage system illustrated in FIG. 10, the pipeline structure 120 includes a trunk pipeline 121, device connection pipes 122, second valves 123, and a bypass pipeline 126. The two long side pipelines of the trunk pipeline 121 are connected by the bypass pipeline 126. Each compression energy storage part 201 is connected to the bypass pipeline 126 through the corresponding device connection pipe 122. Each expansion energy release part 401 is connected to the bypass pipeline 126 through the corresponding device connection pipe 122.

Figure 11:
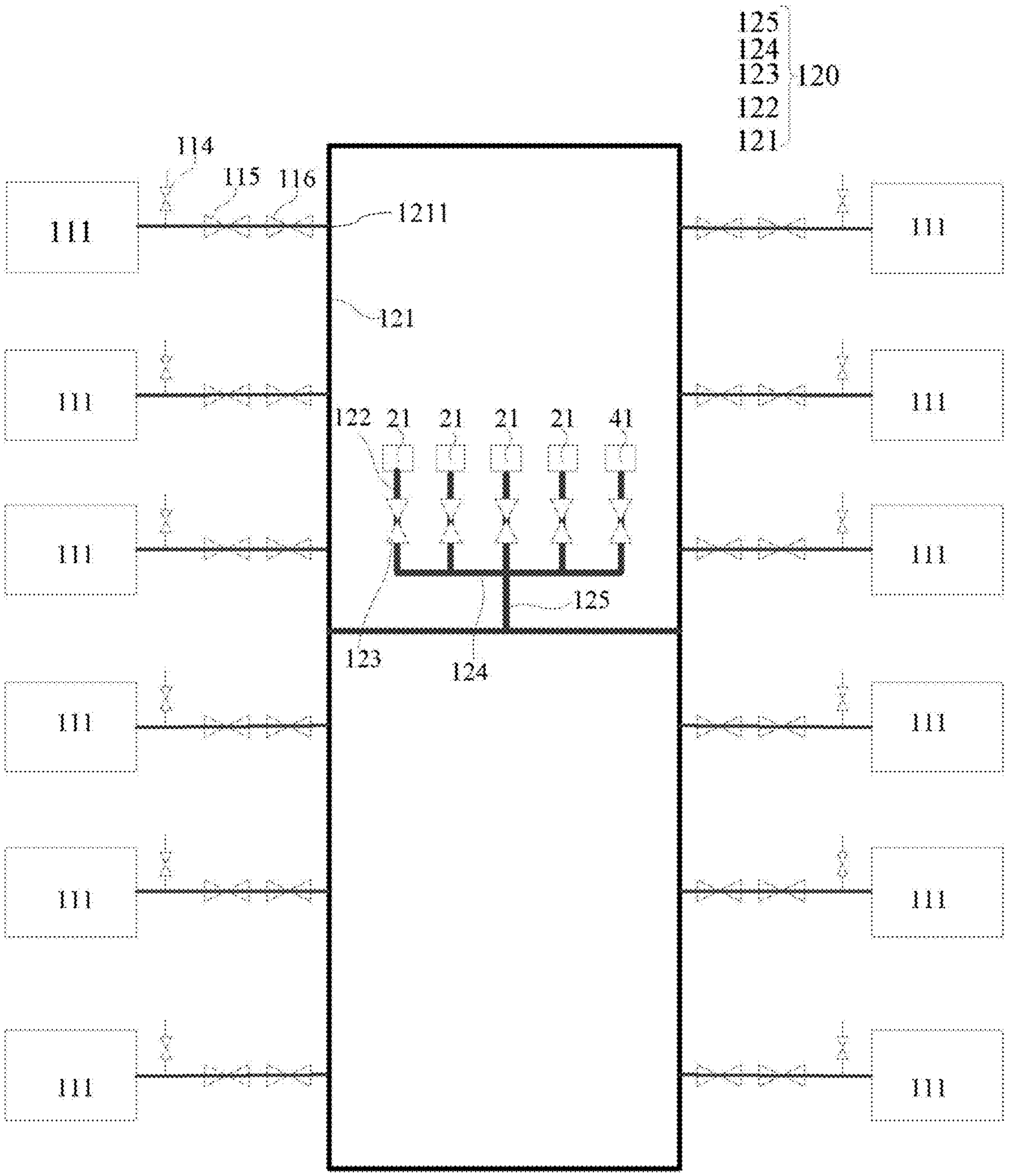
FIG. 11 illustrates a fifth schematic structural diagram of the carbon dioxide energy storage system according to an embodiment of the disclosure.

For another example, in the carbon dioxide energy storage system illustrated in FIG. 11, the pipeline structure 120 includes a trunk pipeline 121, device connection pipes 122, second valves 123, a dispatch pipeline 124, a buffer pipeline 125, and a bypass pipeline 126. The two long side pipelines of the trunk pipeline 121 are connected to each other through the bypass pipeline 126. Each compression energy storage part 201 is connected to the dispatch pipeline 124 through a corresponding device connection pipe 122. Each expansion energy release part 401 is connected to the dispatch pipeline 124 through a corresponding device connection pipe 122. The dispatch pipeline 124 is connected to the bypass pipeline 126 through the buffer pipeline 125. Further, a distance between a connection position of the bypass pipeline 126 and the buffer pipeline 125 and an end of the bypass pipeline 126 is 40% to 60% of a length of the bypass pipeline 126, and in particular, can be 45 to 55%, in an embodiment, it can be 50%.

In the exemplary embodiment of FIG. 8, the structure of the pipeline structure 120 is exemplarily described by taking the example that the connection pipe 113 of the gas storage assembly 110 extends out of the gas storage reservoir 111 from the short edge side of the gas storage reservoir 111. Further, in these embodiments, the pipeline structure 120 may not pass through the gas storage reservoir 111, for example, the trunk pipeline 121 is located outside the short edge side of the gas storage reservoir 111. Certainly, if necessary, the trunk pipeline 121 or other pipelines of the pipeline structure 120 may also pass through the gas storage reservoir 111. It can be understood that in other embodiments of the disclosure, the connection pipe 113 of the gas storage assembly 110 may also pass through the long edge side of the gas storage reservoir 111, and the trunk pipeline 121 may also pass through the gas storage reservoir 111 (for example, pass under the gas storage reservoir 111).

Figure 9:
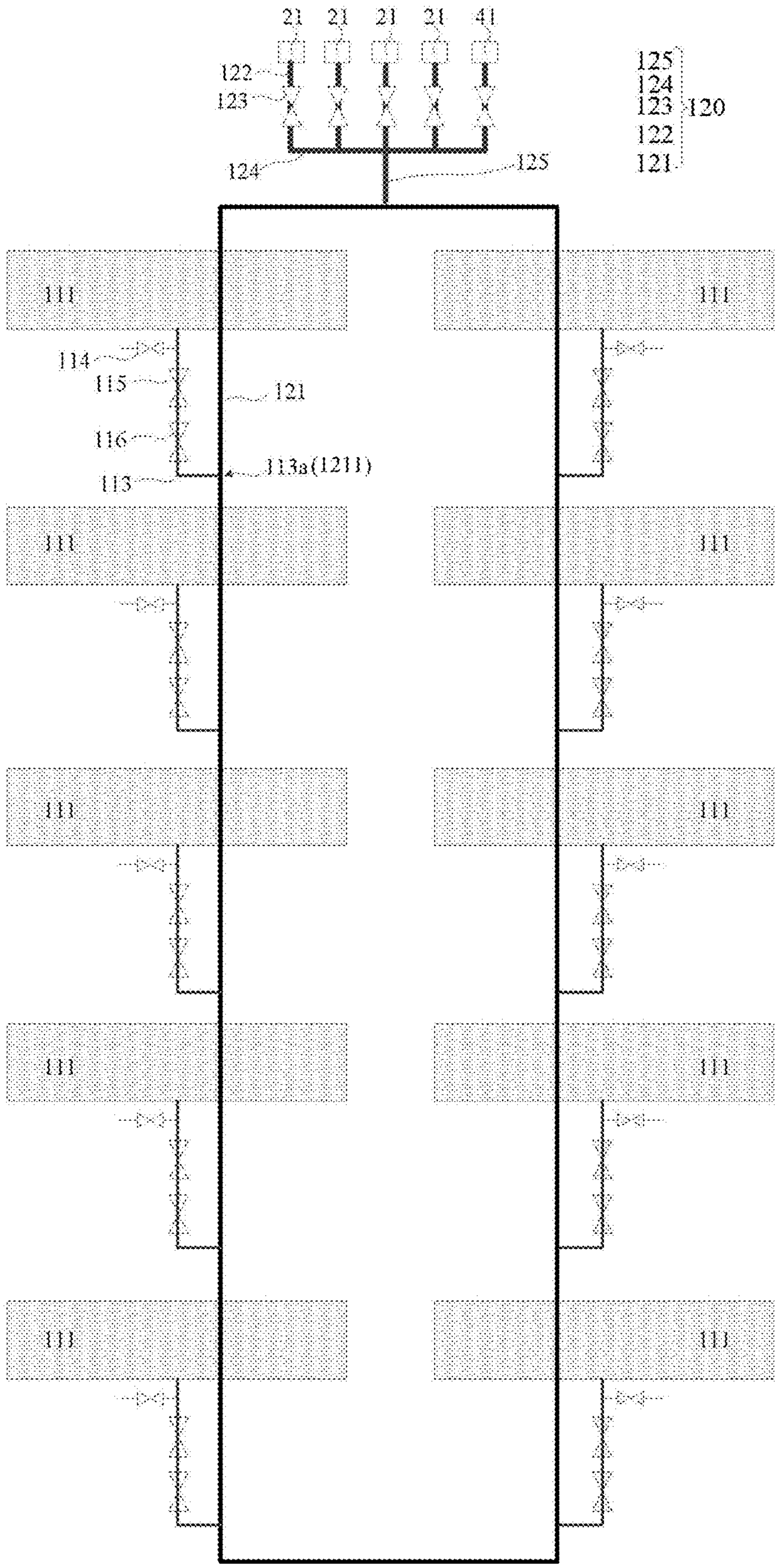
FIG. 9 illustrates a third schematic structural diagram of the carbon dioxide energy storage system according to an embodiment of the disclosure.

For example, in the carbon dioxide energy storage system illustrated in FIG. 9, the connection pipe 113 of the gas storage assembly 110 extends from the long edge side of the gas storage reservoir 111 to the scope of the gas storage reservoir 111, and the trunk pipeline 121 passes through the scope of the gas storage reservoir 111 and is connected to the second end 113*a* of the connection pipe 113 outside the scope of the gas storage reservoir 111, thereby connecting the gas storage assembly 110 to the pipeline structure 120. Furthermore, the long side pipeline of the trunk pipeline 121 is perpendicular to the length direction of the gas storage reservoir 111 and passes through the scope of the gas storage reservoir 111.

Those skilled in the art will readily appreciate other embodiments of the disclosure after considering the specification and practicing the disclosure. This application is intended to cover any modification, use or adaptation of the disclosure, which follows the general principles of the disclosure and includes common knowledge or customary techniques in the art that are not disclosed in the disclosure. The specification and embodiments are intended to be exemplary only, and the true scope and spirit of the disclosure are indicated by the appended claims.

What is claimed is:

1. A gas storage subsystem, applied to a carbon dioxide energy storage system, wherein the carbon dioxide energy storage system comprises an energy storage assembly, an energy storage container and an energy release assembly sequentially connected in that order; and the gas storage subsystem comprises a pipeline structure and a plurality of gas storage assemblies;

wherein at least one of the energy storage assembly and the energy release assembly is connected to the pipeline structure;

wherein the pipeline structure is connected to each of the plurality of gas storage assemblies to rebalance a gas flow rate and gas pressure flowing into or out of each of the plurality of gas storage assemblies; and the pipeline structure comprises at least one trunk pipeline, the at least one trunk pipeline has a plurality of connection ports, and the plurality of connection ports are connected to the plurality of gas storage assemblies, respectively;

wherein at least adjacent two of the plurality of connection ports of the at least one trunk pipeline are connected, to make inlet flow or outlet flow and pressure of corresponding two of the plurality of gas storage assemblies connected to the at least adjacent two of the plurality of connection ports more balanced;

wherein each of the plurality of gas storage assemblies comprises a gas storage reservoir and a connection pipe; a first end of the connection pipe is connected to a gas storage space of the gas storage reservoir, and each of the plurality of connection ports is connected to a second end of the connection pipe of each of the plurality of gas storage assemblies; an exhaust mechanism is disposed on the connection pipe, and a cut-off valve is disposed between the exhaust mechanism and the second end of the connection pipe; the exhaust mechanism is configured to connect the gas storage space of the gas storage reservoir with an external space when the exhaust mechanism is opened; and the cut-off valve is configured to make each of the plurality of gas storage assemblies to be independently controlled to turn off or on;

wherein the energy storage assembly comprises at least one compression energy storage part; and the energy release assembly comprises at least one expansion energy release part;

wherein the pipeline structure further comprises a plurality of device connection pipes corresponding to the at least one compression energy storage part and the at least one expansion energy release part in a one-to-one manner;

wherein an inlet of the at least one compression energy storage part is connected to the at least one trunk pipeline through a corresponding one of the plurality of device connection pipes;

wherein an outlet of the at least one expansion energy release part is connected to the at least one trunk pipeline through another corresponding one of the plurality of device connection pipes; and wherein the plurality of device connection pipes are configured to simplify a pipeline layout of the energy storage assembly, the energy release assembly and the at least one trunk pipeline.

2. The gas storage subsystem as claimed in claim 1, wherein the at least one trunk pipeline is annular.

3. The gas storage subsystem as claimed in claim 2, wherein an extension direction of a part of the at least one trunk pipeline connected to the plurality of gas storage assemblies is perpendicular to a length direction of the gas storage reservoir of each of the plurality of gas storage assemblies, to thereby increase a number of the plurality of gas storage assemblies connected to the at least one trunk pipeline.

4. The gas storage subsystem as claimed in claim 3, wherein the exhaust mechanism and the cut-off valve are located outside the gas storage reservoir, to facilitate operation and control of each of the plurality of gas storage assemblies.

5. The gas storage subsystem as claimed in claim 3, wherein a flow regulation mechanism is further disposed on the connection pipe, and the flow regulation mechanism is located outside the gas storage reservoir.

6. A carbon dioxide energy storage system, comprising the gas storage subsystem as claimed in claim 3.

7. The gas storage subsystem as claimed in claim 2, wherein the exhaust mechanism and the cut-off valve are located outside the gas storage reservoir, to facilitate operation and control of each of the plurality of gas storage assemblies.

8. The gas storage subsystem as claimed in claim 2, wherein a flow regulation mechanism is further disposed on the connection pipe, and the flow regulation mechanism is located outside the gas storage reservoir.

9. A carbon dioxide energy storage system, comprising the gas storage subsystem as claimed in claim 2.

10. The gas storage subsystem as claimed in claim 1, wherein the pipeline structure further comprises a dispatch pipeline, an inlet of the at least one compression energy storage part is connected to the dispatch pipeline through a corresponding one of the plurality of device connection pipes; an outlet of the at least one expansion energy release part is connected to the dispatch pipeline through another corresponding one of the plurality of device connection pipes; and the dispatch pipeline is connected to the at least one trunk pipeline.

11. The gas storage subsystem as claimed in claim 10, wherein the exhaust mechanism and the cut-off valve are located outside the gas storage reservoir, to facilitate operation and control of each of the plurality of gas storage assemblies.

12. The gas storage subsystem as claimed in claim 10, wherein a flow regulation mechanism is further disposed on the connection pipe, and the flow regulation mechanism is located outside the gas storage reservoir.

13. A carbon dioxide energy storage system, comprising the gas storage subsystem as claimed in claim 10.

14. The gas storage subsystem as claimed in claim 1, wherein the exhaust mechanism and the cut-off valve are located outside the gas storage reservoir, to facilitate operation and control of each of the plurality of gas storage assemblies.

15. The gas storage subsystem as claimed in claim 1, wherein a flow regulation mechanism is further disposed on the connection pipe, and the flow regulation mechanism is located outside the gas storage reservoir.

16. A carbon dioxide energy storage system, comprising the gas storage subsystem as claimed in claim 1.

* * * * *